United States Patent [19]
Gentile

[11] Patent Number: 4,876,488
[45] Date of Patent: Oct. 24, 1989

[54] RASTER ROTATION CIRCUIT

[75] Inventor: Geoffrey E. Gentile, Hammonton, N.J.

[73] Assignee: The Boeing Company, Seattle, Wash.

[21] Appl. No.: 102,676

[22] Filed: Sep. 30, 1987

[51] Int. Cl.[4] .................... H01J 29/52; G06F 15/626; G09G 1/06

[52] U.S. Cl. .................................... 315/378; 364/521; 340/727

[58] Field of Search ................ 315/378, 369; 340/727, 340/723; 358/237; 364/521, 731

[56] References Cited

U.S. PATENT DOCUMENTS 2,552,437 5/1951 Korman .
2,945,223 7/1960 Easy .
3,476,974 11/1969 Turnage, Jr. et al. .
3,544,833 12/1970 Miura et al. .
3,858,085 12/1974 Dildy, Jr. et al. .
3,925,765 12/1975 Berwin et al. ...................... 315/378
3,959,582 5/1976 Law et al. .......................... 364/521
4,245,321 1/1981 Gennetten .......................... 364/521
4,551,657 11/1985 Miller et al. .

*Primary Examiner*—Thomas H. Tarcza
*Assistant Examiner*—Gregory C. Issing
*Attorney, Agent, or Firm*—Jones, Tullar & Cooper

[57] ABSTRACT

A system for rotating images on a raster display device through an angle includes a tilt angle signal, first and second tilt angle sine function modulators and first and second tilt angle cosine function modulators. The horizontal deflection circuit of the display device is driven by a ramp signal which is the sum of the horizontal sweep generator output multiplied by the second cosine function modulator plus the vertical sweep generator output multiplied by the second sine function modulator. Similarly, the vertical deflection circuit of the display unit is driven by a ramp signal which is the sum of the vertical sweep generator output multiplied by the first cosine function modulator plus the horizontal sweep generator output multiplied by the first sine function modulator. Variation of the tilt angle signal varies the sine and cosine functions and produces a corresponding rotation of the display image.

4 Claims, 3 Drawing Sheets

RASTER ROTATION CIRCUIT

BACKGROUND OF THE INVENTION

The present invention relates to image rotation of scanning displays, and more particularly to circuitry for rotating the image on a cathode ray tube or simialr raster-driven display device by electronically rotating the deflecting circuits. Most specifically, the present invention relates to a system for rotating a helmet image display to compensate for tilting of the helmet wearer's head.

Raster video images are a standard feature of most aircraft in use today. In recent years, it has been found desirable in some instances to mount such displays on the pilot's headgear, or helmet, so that the display is always in his field of view. Such helmet displays may incorporate a small cathode ray tube or other similar display screen where a raster scanning type display provides a radar image for easy viewing by the pilot. Such displays present problems, however, if the image is not in register with the background which is within the remaining field of vision of the pilot. This lack of register can occur, for example, when the pilot tilts his head and causes the display unit also to tilt with respect to the horizon. In existing displays, this would result in tilting of the image of the horizon with respect to the actual horizon, and this can confuse or disorient the pilot. What is needed, therefore, is a technique for adjusting the image so that it remains in alignment with a reference such as the horizon or some other background object, so that when the pilot tilts his head, the image will remain in synchronism with the background.

Various methods of rotating images are known in the art, but methods such as the use of scan conversion, can be expensive in terms of size, weight and power, as well as in terms of dollars. The use of stroke type displays, also known variously as random access or vector displays, is viable only if the display is limited to symbology, and no images are displayed. Further, the recording of stroke displays is inconvenient. Thus, there is a need to develop an inexpensive, low power, accurate method and circuitry for electronically rotating a scanned image.

SUMMARY OF THE INVENTION

It is, therefore, an object of the present invention to provide circuitry for rotating the image of a display.

It is a further object of the invention to compensate for the tilting of a display unit to maintain the displayed image in a predetermined orientation.

A still further object of the invention is to provide a method for electronically rotating the image of a raster-type display so as to compensate for tilting of the display device, thereby to maintain the displayed image in a predetermined orientation.

Briefly, the present invention is directed to circuitry which responds to the tilting of a raster-type display unit with respect to a predetermined reference, such as the horizon, to provide a compensating rotation of the displayed image so as to maintain a predetermined relationship with the reference. Helmet mounted display units currently in use provide an image which changes with motion of the user's head in vertical and horizontal directions so that when the pilot turns his head from left to right, the displayed image will follow that direction of motion, and will similarly change in accordance with motion of the pilot's head in a vertical direction. However, such displays presently available will not compensate for tilting of the pilot's head; the display simply tilts with the motion of the head, causing the display to become skewed with respect to the horizontal and to no longer match the pilot's field of vision beyond the display unit. Further, the skewing of the display with respect to the real world can disorient the pilot and cause serious problems.

In accordance with the present invention, a suitable mechanism such as a conventional magnetic head roll tracker is mounted adjacent or on the pilot's helmet to measure the degree of tilt of the helmet, and thus of the display unit, with respect to a reference position, in addition to measuring the horizontal and vertical motions of the helmet along the X and Y axes of the display. Preferably, the roll tracker consists of three coils arranged in quadrature on the helmet and three corresponding coils arranged in quadrature on an adjacent stationary reference frame element. Energization of the roll tracker coils on the helmet produces magnetic fields which are detected by the stationary coils, which provide outputs to indicate the exact position and angle of the pilot's head with respect to the stationary coils. Such magnetic trackers are commercially available from Polhemus Navigation Sciences Corporation, a division of McDonnel Douglas Corporation. The roll tracker provides an output signal which is representative of the tilt angle $\phi$.

In accordance with the invention, the tilt angle signal is supplied to the raster circuit of the cathode ray display used in the image display device. The display device has normal X and Y reference axes, and control circuitry is provided to cause the vertical and horizontal raster sweep generator outputs V and H for the display device to be rotated from their normal vertical and horizontal planes in accordance with the value of the tilt angle to thereby rotate the deflection circuits of the display device with respect to the reference X and Y axes. The control circuitry includes sine and cosine modulator networks for both the vertical and horizontal deflection circuits in the display device so that the output signals V and H from the sweep generators are modified in accordance with the appropriate sine and cosine functions. This effectively rotates the horizontal and vertical rasters with respect to the display screen X and Y axes in accordance with the following conversions:

$$V' = V\cos\phi + H\sin\phi \quad (1)$$

$$H' = H\cos\phi + V\sin\phi \quad (2)$$

where V' is the vertical deflection voltage and H' is the horizontal deflection voltage applied to the display unit deflection circuits.

In accordance with the foregoing equations (1) and (2), the output of the cosine fuction modulator network for the vertical sweep generator is added in a summing circuit to the output of the sine function modulator network for the horizontal sweep generator to produce the modified raster sweep voltage V' that is applied to the vertical deflection circuitry of the display unit. Similarly, the output of the sine function modulator network for the vertical sweep generator is added to the output of the cosine function modulator network for the horizontal sweep generator and the resulting raster sweep voltage H' is applied to the horizontal deflection circuitry for the display device. The sine and cosine modulator outputs each are functions of the instantaneous values of the sweep generators and of the signal representing the tilt angle $\phi$. For the condition when $\phi$ equals zero, then the voltage V' applied to the vertical deflection circuit equals the vertical sweep generator output voltage V, and the voltage H' applied to the horizontal deflection circuit equals the horizontal sweep generator output voltage H, thereby yielding a normal display for this condition. On the other hand, when $\phi$ equals 90°, V' equals H and H' equals V, yielding a rotation at the horizontal and the vertical deflection circuits of 90°, so that the horizontal axis replaces the vertical axis, and vice-versa. The center of rotation of the display will be the zero deflection point where V' equals zero and H' equals zero. The center of rotation will normally be the geometric center of the display screen, with V and H being bipolar signals symmetrical about zero. The center of rotation can, however, be offset by introducing a bias to offset the sweep signals by a corresponding amount.

The system can be implemented in a variety of ways, including a fully digital approach for modulating the output of the sweep generators. A preferred form involves the use of multiplying digital to analog converters (DACs) to perform the sine and cosine multiplications. The required sine and cosine coefficients would be stored in a read only memory (ROM) look up table, and by using current output digital to analog converters. The summing can be done by simply connecting these outputs together. Since both the sine and cosine factors are each used twice, only two look up ROMs are required, in addition to four DACs. This reduces the cost, size, weight and power consumption of the rotating circuitry. Furthermore, this arrangement eliminates the sawtooth patterns that often appear on lines which are only slightly off horizontal. The circuitry is applicable to both electostatic and magnetic deflection systems with the restrictions that both the horizontal and vertical deflection systems must have sufficient band width to be interchanged.

In large magnetic deflection systems, a modification of the basic system may be used, wherein two sets of deflection amplifiers and deflection yokes are utilized. The yoke coils are in quadrature, with the summing function being accomplished in the magnetic fields generated by the yokes, rather than in separate summing networks.

BRIEF DESCRIPTION OF THE DRAWINGS

The foregoing and additional objects, features and advantages of the present invention will become apparent to those of ordinary skill in the art from a consideration of the following detailed description of the invention taken in conjunction with the accompanying drawings, in which.

DESCRIPTION OF THE PREFERRED EMBODIMENT

Figure 1:
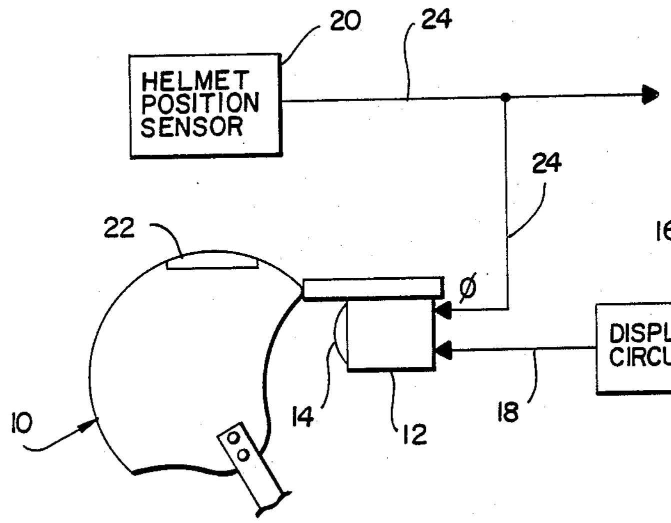
FIG. 1 is a diagrammatic illustration of a helmet-mounted image display unit.
Figure 2:
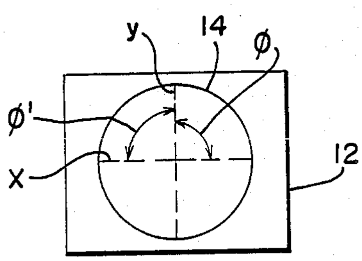
FIG. 2 is a diagrammatic view of the face of the display unit of FIG. 1.

Turning now to more detailed consideration of one embodiment of the present invention, there is illustrated at 10 in FIGS. 1 and 2 a conventional head gear, or helmet, which is to be worn by a member of a crew of an aircraft, for example. Mounted on the front of the helmet 10 is a small display unit 12, having a screen 14 on which is produced any desired display, such as a radar display, as is conventionally known. The display is generated by conventional horizontal and vertical deflection circuits in the display device which cause an electron beam to scan the face of screen 14, and beam modulating circuitry 16 which produces on line 18 the modulating signals which vary the intensity of the electron beam as it is scanned.

In conventional manner, the display unit 12 incorporates a horizontal sweep generator and a vertical sweep generator which produce the display raster which is modulated by the signals on line 18 to produce the desired image display on screen 14. Since the display unit 12 only includes horizontal and vertical sweep generators, the display on screen 14 will retain as its axis of reference a horizontal line Y and a vertical line X across the screen (see FIG. 2). When the wearer of the helmet is sitting upright, the horizontal reference axis on the screen is parallel to the horizon and the vertical reference is perpendicular thereto. The image appearing on the screen, for example a radar display, then corresponds to the background for the display unit which is viewed by the wearer when he looks beyong the display unit. Turning the helmet to the left or to the right in a horizontal plane causes the display unit to move in that plane and does not disrupt the wearer's ability to relate the displayed image to the background. Similarly, a pivoting of the wearer's head in a vertical plane causes the display unit to move up and down along the vertical axis of the display, and again does not disrupt the viewer's perception of the displayed image with respect to the background. However, a tilting of the wearer's head; i.e., motion in a plane parallel to the plane defined by the X and Y axes of the display screen, causes the display unit to tilt through an angle $\phi$ if to the right and an angle $\phi'$ if to the left, as viewed in FIG. 2, thereby also tilting the horizontal display axis X with respect to the actual horizon. This tilting of the display with respect to the horizontal background reference causes confusion to the wearer.

In accordance with the present invention, a helmet position sensor 20 is provided which is located in a known position adjacent the normal position of the helmet 10 when it is in use. The helmet may incorporate a corresponding position marker 22 which may be sensed by the sensor 20. The marker 22 and the sensor 20 make up a roll tracking system which produces an output tilt angle signal corresponding to the tilting of the helmet through an angle $\phi$ or $\phi'$ away from the vertical. This tilt angle signal is applied to the display unit 12 by way of line 24 to modify the vertical and horizontal sweep generator outputs in order to rotate the display on screen 14 in the opposite direction to compensate for the tilting, or rolling motion of the helmet and of the display unit. The marker 22 may, for example, consist of three coils mounted in quadrature which, when energized, produce magnetic fields which can be detected by corresponding sensing coils which are also arranged in quadrature in the position sensor 20.

The coils 22 may be energized sequentially and the strength and direction of each resulting magnetic field detected by the three coils in the sensor 20. Conventional vector analysis techniques may be used to determine the degree of tilt, and thus the tilt angle $\phi$ or $\phi'$. For simplicity, the following discussion will refer only to the tilt angle $\phi$, but it will be understood that the angle $\phi'$ is also included.

Figure 3:
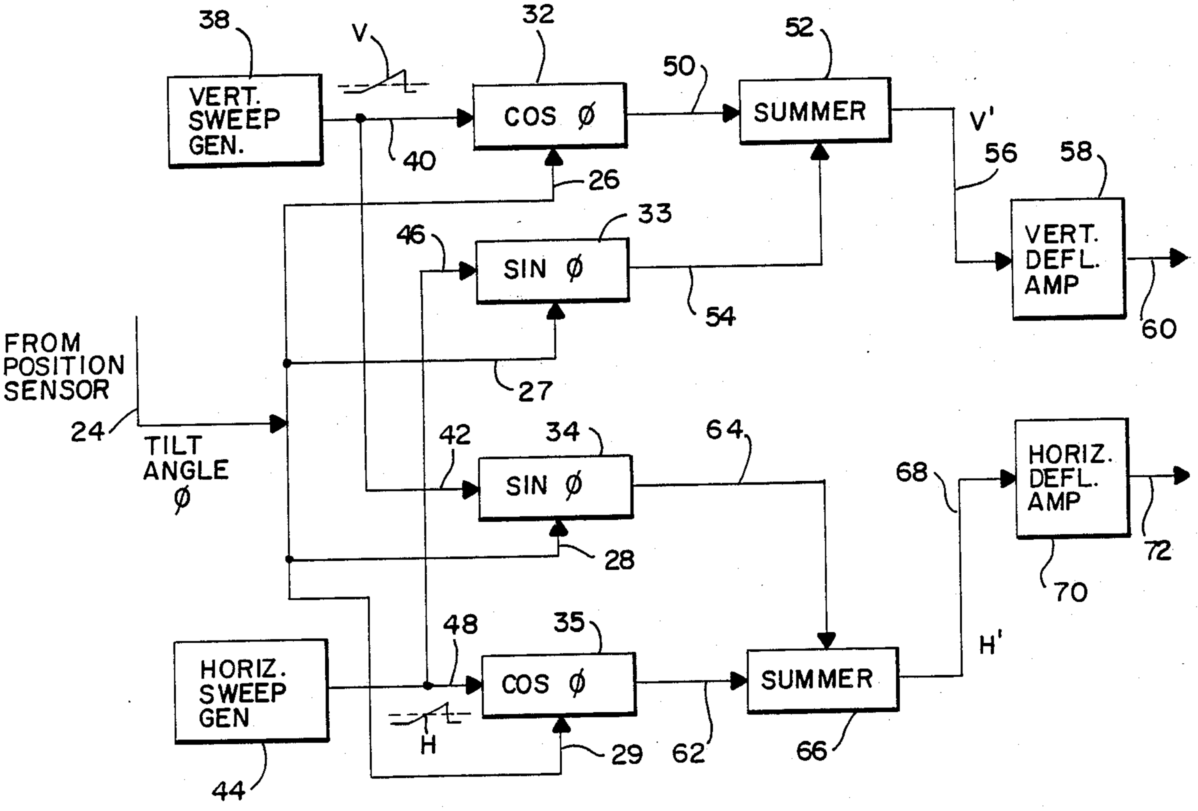
FIG. 3 is a block diagram of a raster rotation circuit in accordance with the present invention.

As illustrated in FIG. 3, the signal on line 24 representing the tilt angle $\phi$ or ($\phi'$) from the position sensor is supplied by way of lines 26, 27, 28 and 29 to respective modulator circuits 32 to 35. Modulator circuits 32 and 35 are cosine function circuits, while modulator circuits 33 and 34 are sine function circuits. The display unit 12 includes a vertical sweep generator 38 having an output ramp voltage V which is supplied by way of line 40 to the cosine modulator 32 and by way of line 42 to the sine modulator 34. In similar manner, the display unit 12 includes a horizontal sweep generator 44 which produces an output voltage H that is supplied by way of line 46 to sine modulator 33 and by way of line 48 to cosine modulator 35. The sweep generators 38 and 44 are conventional raster generators which produce ramp voltages which vary with time in a linear manner to drive the deflection circuits of raster display devices such as cathode ray tubes and to cause an electron beam to sweep horizontally and vertically across the screen 14. The intensity of the swept beam is controlled by the display circuits 16, as is well known.

In accordance with the present invention, the output of the cosine modulator 32 is supplied by way of line 50 to a summing network 52 where the signal on line 50 is added to the output of sine modulator 33, which output is supplied to the summing network 52 by way of line 54. The output of network 52 is a vertical sweep voltage V', which is supplied by way of line 56 to the vertical deflection circuit of the display unit, which may include an amplifier 58. The output of this amplifier is supplied by way of line 60 to a conventional vertical deflection coil or plate (not shown) for the display unit.

In similar manner, the output of cosine modulator 35 and the output of sine modulator 34 are supplied by way of lines 62 and 64, respectively, to a second summing network 66, the output of which is the modified horizontal sweep generator output voltage H'. This voltage is supplied by way of line 68 to the horizontal deflection circuit of the display unit, which may include an amplifier 70. The output of amplifier 70 is supplied by way of line 72 to a conventional horizontal deflection coil (not shown).

In the circuit of FIG. 3, the vertical sweep generator 38 produces a ramp voltage V which is supplied to the cosine network 32, where the instantaneous value of the ramp voltage is multiplied by the cosine function of the tilt angle $\phi$. The cosine function of the tilt angle is obtained in any conventional manner, such as from a look up table stored in a read only memory (ROM). Such a table provides a cosine value for each incremental value of the tilt angle, and these increments may be as small as desired. This cosine value is used to modify the vertical sweep generator ramp signal V to produce a signal equal to V cosine $\phi$ on line 50 for application to the summing network 52. The ramp voltage V from the vertical sweep generator is also supplied by way of line 42 to the sine modulator 34 where the instantaneous value of the ramp voltage is multiplied by the sine of the tilt angle $\phi$. The value of the sine function is obtained in any conventional manner, as by means of a look up table stored in a ROM, the value being selected in accordance with the tilt angle $\phi$ supplied to the sine modulator 34 by way of line 28. The resultant signal V sine $\phi$ is applied by way of line 64 to the summing network 66.

In similar manner, the ramp voltage H from the horizontal sweep generator 44 is supplied by way of line 48 to the cosine modulator 35, where its instantaneous voltage is multiplied by the cosine function of the tilt angle $\phi$. The angle $\phi$ is supplied by way of line 29 and the cosine value corresponding thereto is obtained in any conventional manner, as from a look up table stored in a ROM. The output signal H cosine $\phi'$ is supplied by way of line 62 to the summing network 66 for addition to the signal supplied by way of line 64.

The sum of the two signals supplied to network 66 is the modified horizontal sweep generator output signal H' defined in equation (2), and which is supplied by way of line 68 to the horizontal deflection circuit amplifier 70 for driving the horizontal deflection coils of the display unit 12.

The ramp voltage H from horizontal sweep generator 44 is also supplied by way of line 46 to the sine function modulator 33, where its instantaneous value is multiplied by the sine function of the tilt angle $\phi$. This sine function is obtained in any conventional manner, as from a look up table stored in a ROM. The output signal from modulator 33 is the value H sine $\phi$, and this is supplied to summing network 52 by way of line 54.

The sum of the two signals supplied to net work 52 is the modified vertical sweep generator output signal V' described in equation (1) above. This voltage is supplied by way of line 56 to the vertical deflection circuit amplifier 58 for driving the vertical deflection coils of the display unit 12.

The addition of the cosine function of each of the sweep generator outputs to the sine function of the other sweep generator output in the summing networks 52 and 66 result in a rotation of the sweep axes of the two sweep generator output ramps by an amount determined by the tilt angle $\phi$. The center of rotation of the axes is the zero deflection point of the display unit 12 where V' equals zero and H' equals zero. This center of rotation will normally be the geometric center of the display screen 14, as shown in FIG. 2 with the sweep signals V and H being bipolar signals, going from a negative value to a positive value, with the ramp being symmetrical about a zero value indicated by the dotted line in the V and H ramps illustrated in FIG. 3. The center of rotation can, however, be off-set by simultaneously introducing a bias to off-set the sweep generator output signals by a corresponding amount in either the positive or negative direction.

It will noted that when the tilt angle $\phi$ is equal to zero, then the addition of the sine and cosine functions of zero result in the modified vertical sweep signal V' being equal to the generated sweep voltage V and the modified horizontal sweep signal H' being equal to the original sweep signal H, yielding a normal display on the screen 14 of the display unit 12. If the tilt angle $\phi$ is equal to 90°, then the modified signal V' will be equal to H, and the modified signal H' will be equal to V, yielding a raster display that is rotated by 90° on the screen 14. To compensate the display for a tilting of the display unit in order to keep the X axis of the display screen aligned with the horizon, for example, the rotation of the image will be opposite to the direction of tilt. Thus, for example, if the display unit 12 (FIG. 2) is tilted clockwise, in the direction of $\phi$, the X and Y axes would have to be rotated counterclockwise to compensate for the tilt.

Figure 4:
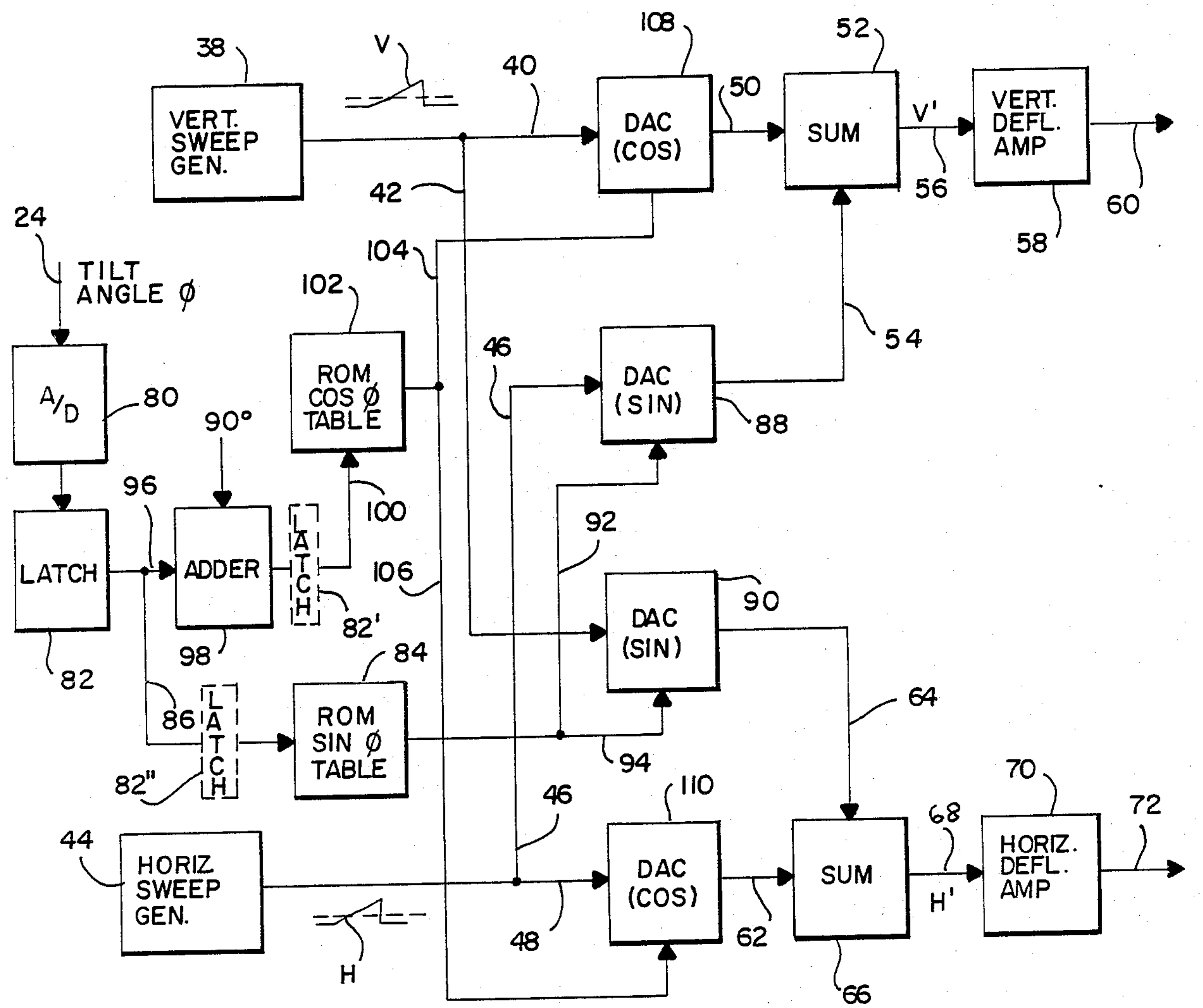
FIG. 4 is a block diagram of a preferred form of the circuit of FIG. 3.

FIG. 4 illustrates a preferred form of the invention described with respect to FIG. 3, illustrating the use of ROM look up tables to provide the cosine and sine functions required for the tilt angle φ. In this Figure, elements common to FIG. 3 are indicated by the same reference numerals. Thus, the device illustrated in FIG. 4 includes a vertical sweep generator 38 supplying its output ramp signal V on lines 40 and 42 and a horizontal sweep generator 44 providing its output ramp H on output lines 46 and 48. The modification of the vertical and horizontal sweep signals is accomplished digitally in the circuit of FIG. 4 through the use of multiplying digital to analog converters (DACs) which perform the sine and cosine multiplications required to rotate the display raster. The tilt angle φ is supplied by way of line 24 if necessary through an analog to digital (A/D) converter 80, to a latch 82. The value in latch 82 is supplied directly to a ROM 84 by way of line 86, the ROM containing a look up table for the incremental values of the function sine φ. The value of the angle in the latch 82 thus produces an output from ROM 84 which represents the sine function of the angle, and this function is supplied to the digital to analog converters 88 and 90 by way of lines 92 and 94, respectively.

The output of latch 82 representing the tilt angle φ is also supplied through line 96 to an adder 98 where the value of the angle is shifter by 90° and the resulting signal supplied by way of line 100 to ROM 102 which contains a look up table containing values corresponding to the cosine function of incremental tilt angles φ. The ROM provides on output lines 104 and 106 the cosine function value of the tilt angle φ, and supplies this signal to the cosine function digital to analog converters 108 and 110, respectively. When the tilt angle signal on line 24 is in digital form, the A/D converter 80 is omitted, and the latch 82 is replaced by latches 82' and 82'', illustrated in dashed lines in FIG. 4.

For any value of the tilt angle φ, the output of the vertical sweep generator 38 is multiplied by the cosine function of φ in DAC 108, and is multiplied by the sine function of φ in the DAC 90. The value of the horizontal sweep generator is similarly multiplied by the cosine and sine functions of φ in digital to analog converters 110 and 88, respectively. The outputs of DACs 108 and 88 are supplied via lines 50 and 54 to the summing network 52 to produce the modified vertical sweep voltage V', and the outputs of DACs 90 and 110 are supplied by way of lines 64 and 62 to the summing network 66, the output of which represents the modified horizontal sweep voltage H'. The values of V' and H' are supplied to their corresponding vertical and horizontal deflection circuit amplifiers 58 and 70 for use in driving their corresponding deflection coils in the display unit 12, as described above.

By using current output DACs, the summing function can be done by simply connecting the DAC outputs together. In addition, since both the sine and cosine factors are each used twice, only two look up ROMs, in addition to the four DACs, are required in the digital circuitry. This circuit is applicable to both electrostatic and magnetic deflection systems as long as both the horizontal and the vertical deflection systems have sufficient band width to be interchanged so as to allow a 90° rotation of the display image.

Figure 5:
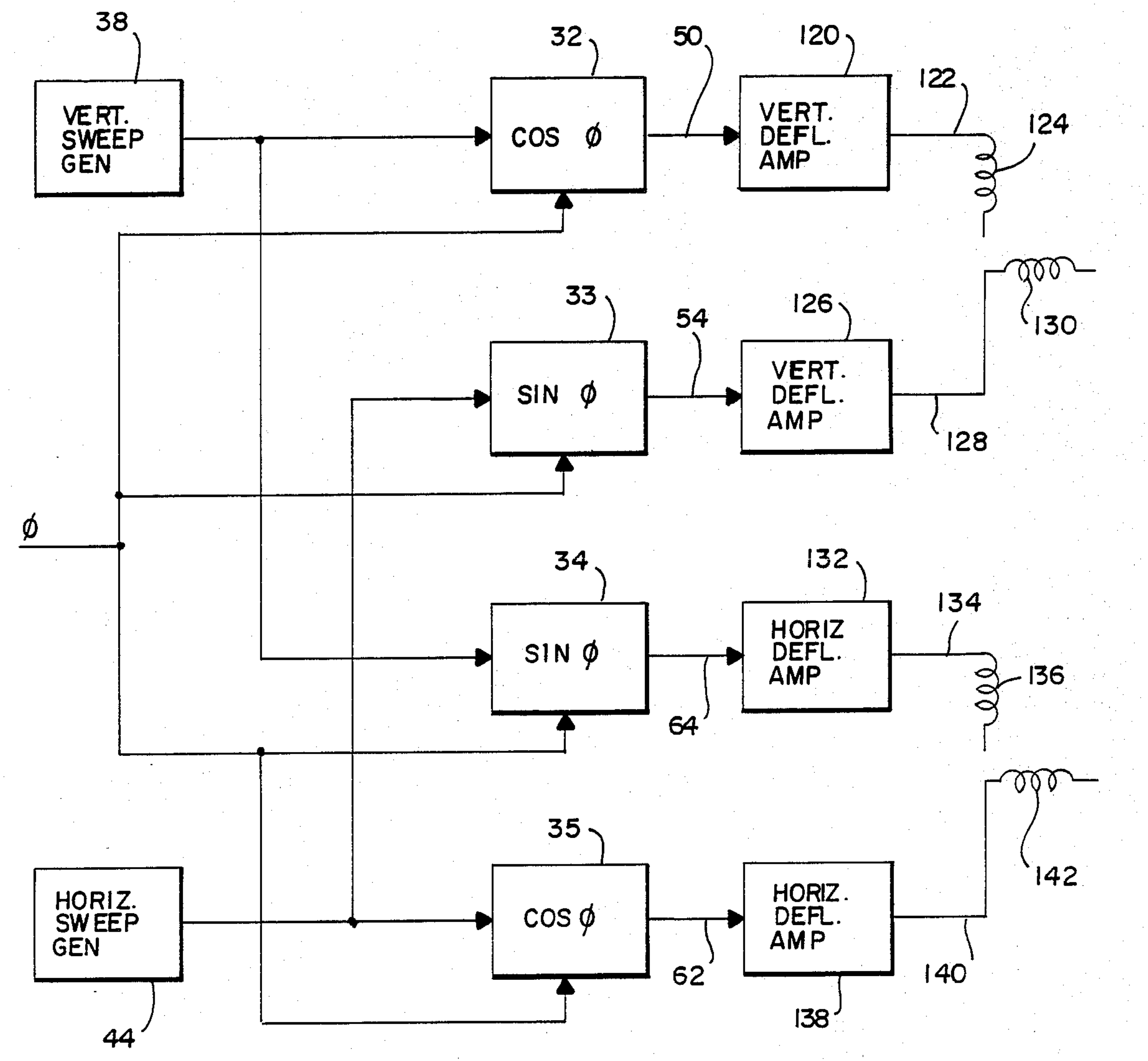
FIG. 5 is a block diagram of a second embodiment of the invention.

In large magnetic deflection systems, a modification of the basic system illustrated in FIG. 2 may be used, as illustrated in FIG. 5. This modified system utilizes two sets of deflection amplifiers and deflection yokes, with the yoke coils for the display unit being in quadrature. The summing function in this case is accomplished in the magnetic fields which are generated by the yoke coils, so that individual summing networks are not required. Thus, in FIG. 5, the vertical and horizontal sweep generators 38 and 44 supply their outputs to the sine and cosine modulators 32 through 35 in the manner described with respect to FIG. 3. However, the output 50 from cosine modulator 32 is connected to a first vertical deflection amplifier 120, the output of which is supplied by way of line 122 to a first vertical deflection coil 124 in the display unit cathode ray tube. The output from the sine modulator 33 is supplied by way of line 54 directly to a second vertical deflection amplifier 126, the output of which is fed through line 128 to a second vertical deflection amplifier 130 which is at a right angle to coil 124. The cosine and sine outputs thus are added in the magnetic fields generated in coils 124 and 130 to effect the deflection of the scanning electron beam in the display tube.

The output from the sine modulator 134 is applied by way of line 64 to a first horizontal deflection amplifier 132, the output of which is fed by way of line 134 to a first horizontal deflection coil 136. The output of cosine modulator 135 is supplied through its output line 62 to a second horizontal deflection amplifier 138, the output of which is supplied by way of line 140 to a second horizontal deflection coil 142. Again, the outputs of the two amplifiers are added in quadrature in the magnetic fields produced by the coils 136 and 142 which are at right angles to each other.

Although the present invention has been described in terms of preferred embodiments, it will be apparent that numerous modifications may be made. For example, although the invention is shown and described in combination with a head-mounted display, where the tilt of a person's head can be compensated for, the system may also find application in aircraft simulators, to permit easy simulation of the banking of an aircraft or in video games, for example. Other application will also be evident to those of skill in the art. Accordingly, the true spirit and scope of the present invention is limited only by the following claims.

What is claimed is:

1. A system for rotating images on a raster display unit by electronically rotating, via digital computation, deflection circuits of the raster display unit to compensate for tilting of the display unit through a tilt angle, comprising:

a raster display unit having a horizontal display axis and a vertical display axis;

a horizontal deflection circuit and a vertical deflection circuit connected to said display unit to produce horizontal and vertical raster sweeps on said display unit;

a horizontal sweep generator for said display unit having a variable analog horizontal output signal;

a vertical sweep generator for said display unit having a variable analog vertical output signal;

analog signal means supplying an analog tilt angle signal for rotating a display image on said display unit with respect to said horizontal and vertical axes by an amount determined by said tilt angle;

tilt angle signal conversion means connected to said analog signal means for conversion of said analog tilt angle signal to a corresponding digital tilt angle signal;

a first read only memory means connected via digital data path to said conversion means and responsive to said digital tilt angle signal to produce a corresponding digital sine function signal;

first and second tilt angle sine function modulators each responsive to said digital tilt angle signal comprising, respectively, first and second multiplying digital-to-analog converters connected to said first read only memory and responsive to said digital sine function signal;

a second read only memory means connected via a digital data path to said conversion means and responsive to said digital tilt angle signal to produce a corresponding digital cosine function signal, first and second tilt angle cosine function modulators each responsive to said tilt angle signal comprising respectively, third and fourth multiplying digital-to-analog converters connected to said second read only memory and responsive to said digital cosine function signal;

first means connecting said analog horizontal output signal to said first multiplying digital to analog converter and to said third multiplying digital-to-analog converter for multiplying said analog horizontal output signal by the sine and by the cosine of said tilt angle to provide first and second modified analog horizontal sweep signals;

second means connecting said analog vertical output signal to said second multiplying digital to analog converter and to said fourth multiplying digital to analog converter for multiplying said analog vertical output signal by the sine and by the cosine of said tilt angle to provide first and second modified analog vertical sweep signals;

third means connecting said first modified analog horizontal sweep signal and said second modified analog vertical sweep signal to the vertical deflection circuit of said display unit; and fourth means connecting said second modified analog horizontal sweep signal and said first modified analog vertical sweep signal to the horizontal deflection circuit of said display unit, whereby said horizontal and vertical deflection circuits rotate said horizontal and vertical display axis and horizontal and vertical raster sweeps by an amount determined by said tilt angle.

2. The system of claim 1, further including means responsive to the roll angle of said display unit to produce a corresponding tilt angle signal to maintain a displayed image in alignment with a fixed reference.

3. The system of claim 1, wherein said third means is a first summing network, and said fourth means is a second summing network.

4. The system of claim 1, wherein said third means comprises first and second vertical deflection amplifiers connected to corresponding first and second vertical deflection coils in said display unit, and wherein said fourth means comprises first and second horizontal deflection amplifiers connected to corresponding first and second horizontal deflection coils in said display unit.

* * * * *